(12) United States Patent  (10) Patent No.: US 8,395,643 B2
Ramig et al.  (45) Date of Patent: Mar. 12, 2013

(54) MOTION-BASED DATA REVIEW AND ZOOM

(75) Inventors: Randal James Ramig, Seattle, WA (US); Seana Seraji, Seattle, WA (US); Scott Andrew Borton, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 946 days.

(21) Appl. No.: 12/123,475

(22) Filed: May 20, 2008

(65) Prior Publication Data

US 2009/0292671 A1 Nov. 26, 2009

(51) Int. Cl.
*G09G 5/00* (2006.01)
(52) U.S. Cl. ........ 345/661; 345/660; 345/662; 345/663; 345/665; 345/666; 707/999.003; 707/999.01; 707/999.101; 707/999.103; 707/999.104
(58) Field of Classification Search .......... 715/243–256; 345/660–671; 707/999.001–999.107
See application file for complete search history.

(56) References Cited

U.S. PATENT DOCUMENTS

| | | | |
|---|---|---|---|
| 6,442,576 | B1 | 8/2002 | Edelman et al. |
| 6,704,722 | B2 | 3/2004 | Wang Baldonado |
| 6,819,339 | B1 | 11/2004 | Dowling |
| 6,823,491 | B1 | 11/2004 | McBrearty et al. |
| 6,826,727 | B1 * | 11/2004 | Mohr et al. ................. 715/235 |
| 7,284,192 | B2 | 10/2007 | Kashi et al. |
| 2003/0187950 | A1 | 10/2003 | Rising, III |
| 2004/0078662 | A1 * | 4/2004 | Hamel et al. ................. 714/22 |
| 2007/0027852 | A1 | 2/2007 | Howard et al. |
| 2007/0073719 | A1 * | 3/2007 | Ramer et al. ................. 707/10 |
| 2007/0124295 | A1 | 5/2007 | Forman et al. |
| 2007/0143265 | A2 | 6/2007 | Risberg et al. |

OTHER PUBLICATIONS

Rodden, K., Milic-Frayling, N., Sommerer, R., & Blackwell, A. "Effective Web Searching on Mobile Devices," Proceedings of the 17th Annual Conference on Human-Computer Interaction, Bath, United Kingdom, Sep. 2003, pp. 281-296.*
King, "WebbIE Manual", Version 3.0, Date of Publication: Jun. 2005, pp. 1-15.
Christel, "Establishing the Utility of Non-Text Search for News Video Retrieval with Real World Users", Proceedings of the 15th international conference on Multimedia, Year of Publication: 2007, ACM New York, NY, USA, pp. 707-716, Sep. 2007.
"IntelliEdit 1.0", Retrieved at <<http://www.flashpeak.com/inted/inted.htm>>, Retrieved Date: Feb. 6, 2008, pp. 2.
Byrne, Jim, "How to make Non-Text Elements Accessible", Retrieved at <<http://www.jimbyrne.co.uk/show.php?contentid=58>>, Jun. 13, 2003, pp. 15.
Chaturvedi, Abhishek, "Accelerometer-supported Tilt as an input method for mobile devices", Retrieved at <<http://www.memsic.com/phocadownload/others/an-00mx-013.pdf>>, Apr. 16, 2003, pp. 13.

* cited by examiner

*Primary Examiner* — David T Welch
*Assistant Examiner* — Matthew D Salvucci

(57) ABSTRACT

Dynamically magnifying search results and enabling motion-based review of the search results. The user enters a query to search the content of a document. As the characters of the query are entered by the user, the search results are identified and magnified such that all the search results after any given input character are visible in the user interface. The user advances through the search results by moving the computing device in a predefined manner. In an embodiment, the user searches the content of a web page rendered in a browser executing on a mobile computing device such as a telephone.

20 Claims, 10 Drawing Sheets

MOTION-BASED DATA REVIEW AND ZOOM

BACKGROUND

Existing computer systems support text searching of a document. A user enters a search query, and the computer system identifies text within the document that matches the search query. Applications support searching to various degrees of sophistication dependent in part on the available resources of the underlying computer system. Desktop web browsers, for example, permit the user to perform a simple search for text in a rendered web page. In a mobile telephone, however, search functionality is limited at least by content density and screen size. Further, many mobile telephones have only the standard 12-button keypad for entering the search query. As such, existing search and review functionality for these and other devices is limited.

SUMMARY

Embodiments of the invention provide motion-based review of search results and automatic enlargement of search results. A document is displayed in a user interface on a computing device. The user enters a search query that includes a sequence of characters. As the characters are input by the user, the search results are narrowed and magnified such that all the search results after any given input character are visible in the user interface. The user advances through the search results by moving the computing device in a predefined manner.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
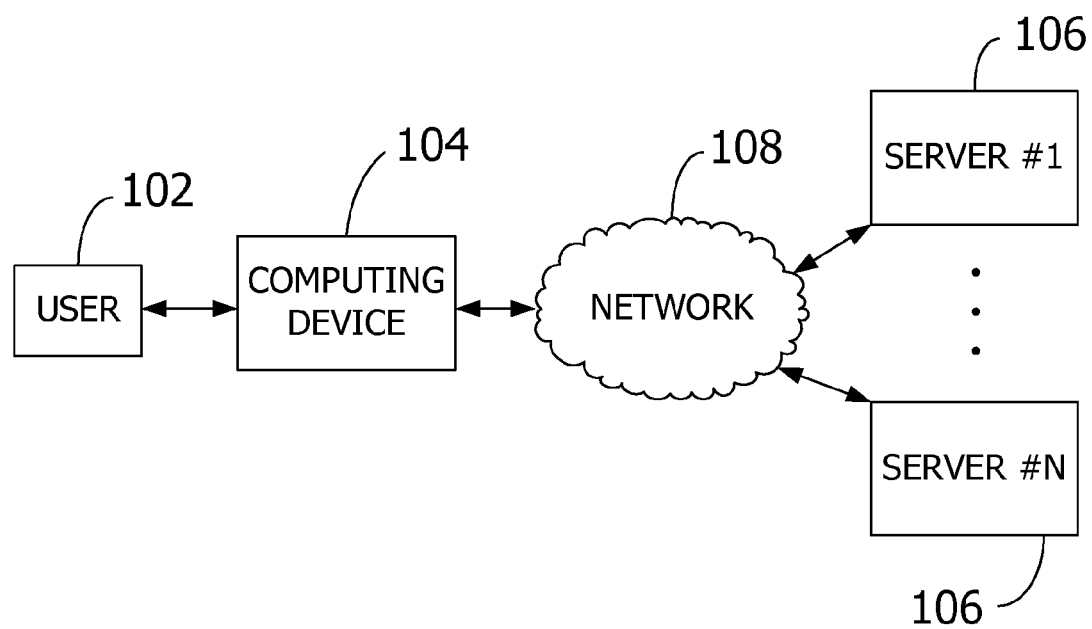
FIG. 1 is an exemplary block diagram illustrating a user interacting with a computing device.

Embodiments of the invention provide search and review of content within one or more documents for a user 102 of a computing device 104 as shown in FIG. 1. In some embodiments, the provided search functionality includes intelligent and anticipatory keyword query searching that dynamically determines search results and narrows the results as the query is entered by the user 102. Further, the documents are automatically scrolled, zoomed (e.g., magnified, enlarged, or reduced), and/or panned to display the search results, in some embodiments.

While some embodiments of the invention are illustrated and described herein with reference to a mobile computing device 202 (e.g., see FIG. 2) such as a telephone, a personal digital assistant, or a gaming console, aspects of the invention are operable with any device that performs the functionality illustrated and described herein, or its equivalent. For example, embodiments of the invention are operable with a desktop computing device, a laptop computer, and other computing devices. Further, while some embodiments of the invention are illustrated and described herein with reference to a browser, aspects of the invention are operable with any application program that performs the functionality illustrated and described herein, or its equivalent. For example, embodiments of the invention are operable with any application program that provides content for display to the user 102. Exemplary applications include word processing applications and financial applications such as a spreadsheet.

Figure 2:
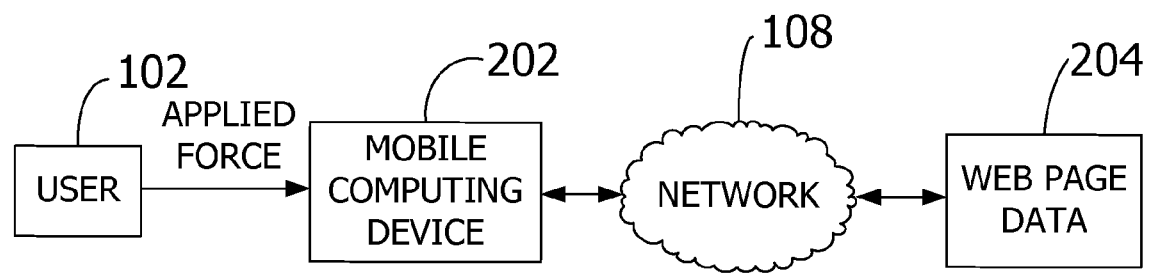
FIG. 2 is an exemplary block diagram illustrating a user applying force to a mobile computing device.

Referring again to FIG. 1, an exemplary block diagram illustrates the user 102 interacting with the computing device 104. The computing device 104 communicates with one or more other computing devices (e.g., servers 106) such as server #1 through server #N via a network 108. In some embodiments, the computing device 104 receives content from one or more of the servers 106 via the network 108 for display to the user 102 by the computing device 104. For example, referring next to FIG. 2, an exemplary block diagram illustrates the user 102 interacting with the mobile computing device 202. The mobile computing device 202 receives web page data 204 (e.g., from one or more of the servers 106 in FIG. 1) via the network 108. In the example of FIG. 2, the user 102 applies force to the mobile computing device 202 to review the search results, as next described with reference to the embodiment of FIG. 3.

Figure 3:
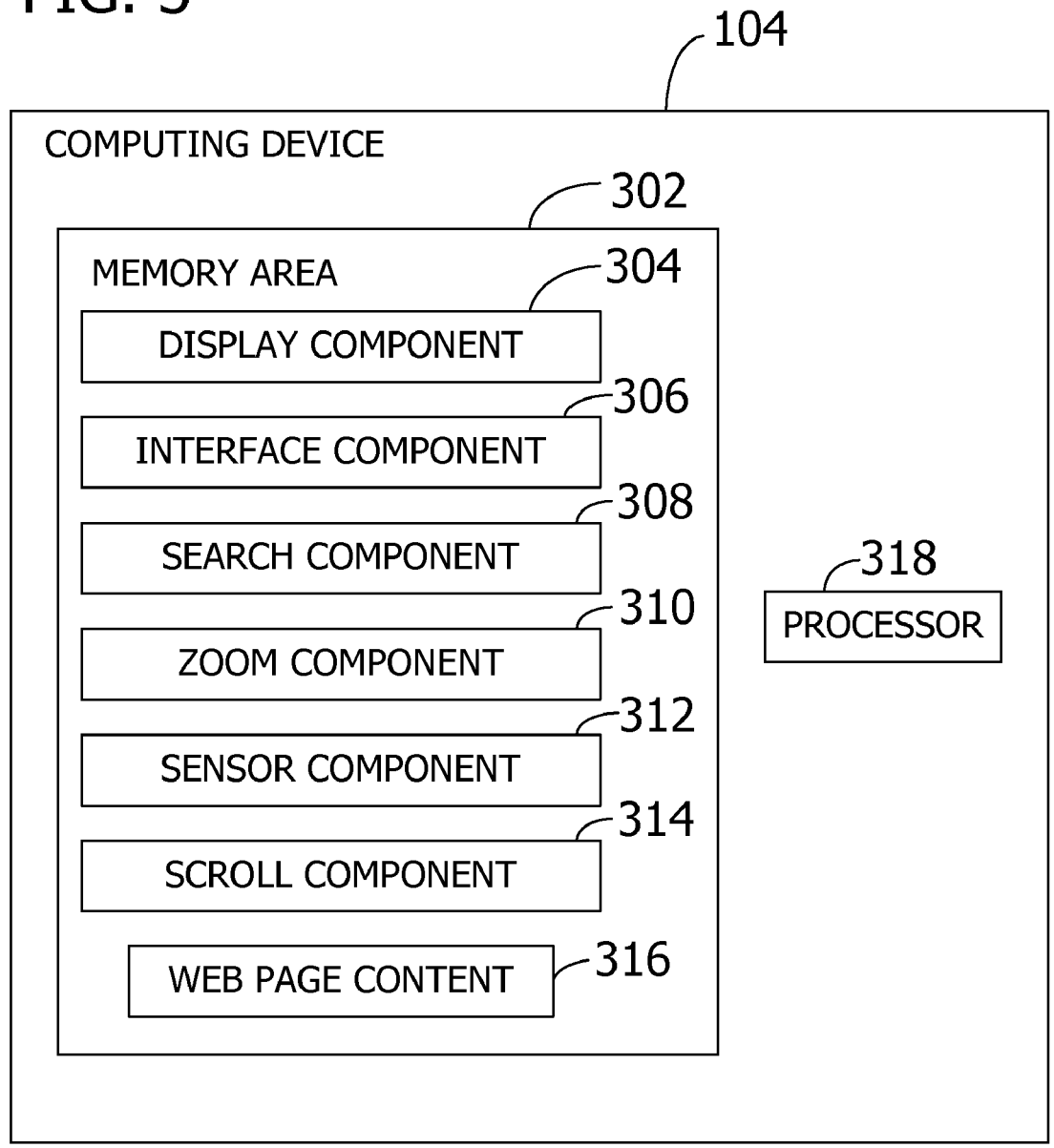
FIG. 3 is an exemplary block diagram illustrating components associated with a computing device implementing aspects of the invention.

Referring next to FIG. 3, an exemplary block diagram illustrates components associated with the computing device 104 for reviewing the results of a search of content in a document. In the embodiment of FIG. 3, the computing device 104 has associated therewith a memory area 302 (e.g., one or more computer-readable media) storing computer-executable components for generating and reviewing search results such as from a web page on the computing device 104. For example, the components include a display component 304, an interface component 306, a search component 308, a zoom component 310, a sensor component 312, and a scroll component 314.

The display component 304 provides textual data associated with web page content 316 rendered in a user interface on the computing device 104. The web page content 316 is associated with a document such as a hypertext markup language (HTML) document and is stored in the memory area 302. The textual data includes text associated with the document, text describing the document or its content, markup text, or metadata associated with the document. For example, the textual data may include file names or descriptions of any images, audio, or video content in the document.

The interface component 306 receives a sequence of keystrokes from the user 102. The sequence of keystrokes corresponds to a search query. In an embodiment in which the computing device 104 includes a mobile telephone, the interface component 306 receives the sequence of keystrokes from the user 102 via a twelve-button keypad on the mobile telephone.

The search component 308 dynamically identifies portions of the textual data provided by the display component 304. The portions represent results of a search of the textual data based on the sequence of keystrokes received from the user 102 by the interface component 306. The zoom component 310 adjusts a size of the web page displayed in the user interface as a function of quantity and location of the portions identified by the search component 308 in the web page such that all the portions are visible to the user 102 within the user interface without scrolling. The display component 304 displays the adjusted web page to the user 102 in the user interface.

For example, the interface component 306 receives a first keystroke or button press from the user 102. The search component 308 identifies one or more portions of the textual data stored in the memory area 302 based on the received first keystroke. The zoom component 310 determines a first size of the document for display in the user interface as a function of the identified portions such that all the portions are visible to the user 102 within the user interface without scrolling. In some embodiments, the first size includes a zoom range determined based on a quantity and location of the identified portions.

The identified portions and the determined first size are provided, for example, to a video card interface for display to the user 102. The interface component 306 receives a second keystroke from the user 102 and the search component 308 identifies a subset of the previously identified portions based on the received second keystroke (e.g., narrows the search results). The zoom component 310 determines a second size of the document for display in the user interface as a function of the identified subset of the portions such that all the portions in the identified subset are visible to the user 102 within the user interface without scrolling. The identified subset of the portions and the determined second size for display are provided, for example, to the video card interface for display to the user 102.

The sensor component 312 receives input from the user 102. For example, the sensor component 312 receives a signal from an accelerometer. Various types of accelerometers are known in the art such as a piezo-electric accelerometer, a piezo-resistive accelerometer, a strain gage accelerometer, and a microelectromechanical accelerometer. Aspects of the invention are operable with these and other types of accelerometers. The input corresponds to movement of the computing device 104 by the user 102. In an embodiment in which the computing device 104 is the mobile computing device 202, the movement includes tilting and/or shaking the mobile computing device 202. The scroll component 314 advances through the identified portions as a function of the input received by the sensor component 312.

A processor 318 associated with the computing device 104 executes computer-executable instructions such as those associated with the components illustrated in FIG. 3.

Figure 4:
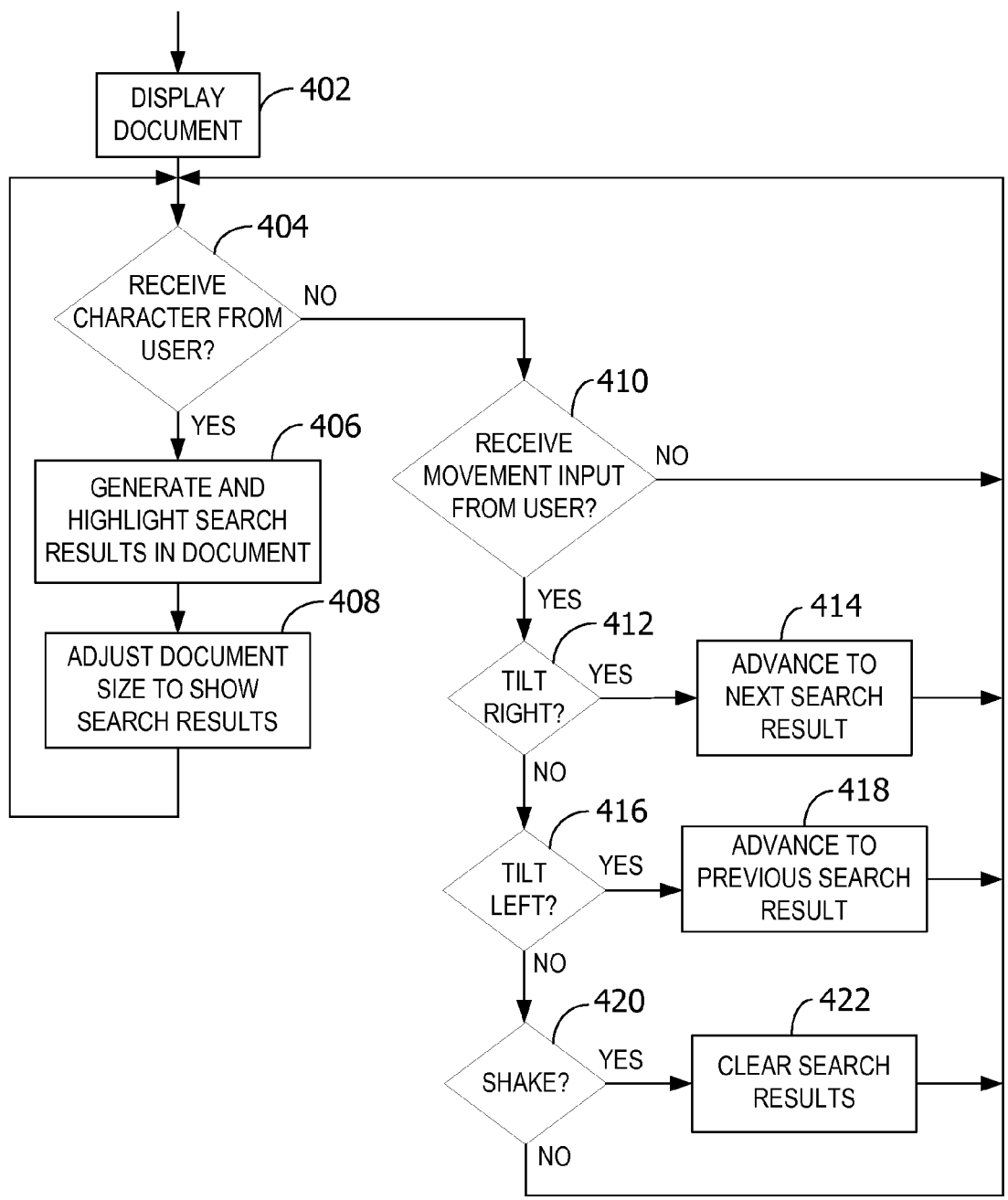
FIG. 4 is an exemplary flow chart illustrating searching, zooming, and motion-based review of search results.

Referring next to FIG. 4, an exemplary flow chart illustrates searching, zooming, and motion-based review of search results. A document is displayed to the user 102 at 402. The document has textual data associated therewith. If a character or keystroke is received from the user 102 at 404, search results are generated and identified in the displayed document at 406. The search results are generated, for example, by applying the received character to textual data associated with the displayed document. Identifying the search results includes any form of distinguishing the search results from the surrounding content. Changing the font color or background color, italicizing, highlighting, increasing the font size, and the like are some examples of ways that the search results may be identified. In some embodiments, the document is automatically scrolled to display the first instance of the search results. A view of the document is adjusted at 408 such that all the search results are visible to the user 102 without the user 102 needing to scroll the document. For example, a size of the document is enlarged or reduced to enable all the results to be visible without scrolling the document.

Multiple keystrokes may be entered by the user 102 with each operation being performed dynamically. For example, with each keystroke, the operations in 404, 406, and 408 are performed.

If a character is not received at 404, but rather movement input is received at 410, embodiments of the invention determine whether the movement corresponds to a particular, predefined movement or gesture. For example, a mapping of movements (or sequence of movements) to actions is stored in the memory area 302 of the computing device 104 in an embodiment. Dependent on the type of movement, the computing device 104 performs certain actions based on the stored mapping. For example, if a particular gesture is made with the computing device 104, the corresponding action is performed. In a further example, a sequence of movements may be made with the computing device 104. The sequence of movements corresponds to a particular action or group of actions. Exemplary movements or gestures are illustrated in FIG. 5A through FIG. 5C.

In an embodiment in which the movement input represents a plurality of tilting movements of the computing device 104 in a first direction and in a second direction, the document is advanced to the next search result responsive to each of the tilting movements in the first direction and advanced to a previous search result responsive to each of the tilting movements in the second direction, in succession. For example, three tilts in the first direction followed by a single tilt in the second direction yields an advance to each of the next three search results followed by a single advance to a previous search result.

In the example of FIG. 4, if the movement corresponds to a tilting of the computing device 104 to the right at 412, a cursor, pointer, or other mechanism for identifying a particular search result advances to the next search result on the document at 414. Other mechanisms for identifying a particular search result include highlighting or magnifying the next search result relative to the surrounding text. Each search result is identified within the displayed document or in a separate page, window, document, or other area of the user interface. Advancing to the next search result includes, for example, scrolling the document to display the identified text. If the movement corresponds to a tilting of the computing device 104 to the left at 416, the cursor advances to a previous search result in the document at 418. The next and previous search results may be defined, for example, based on the location of the search results within the document. For example, the search results may be stored sequentially in the memory area 302. If the movement corresponds to a shaking of the computing device 104 at 420, the search results are cleared at 422.

Figure 5A:
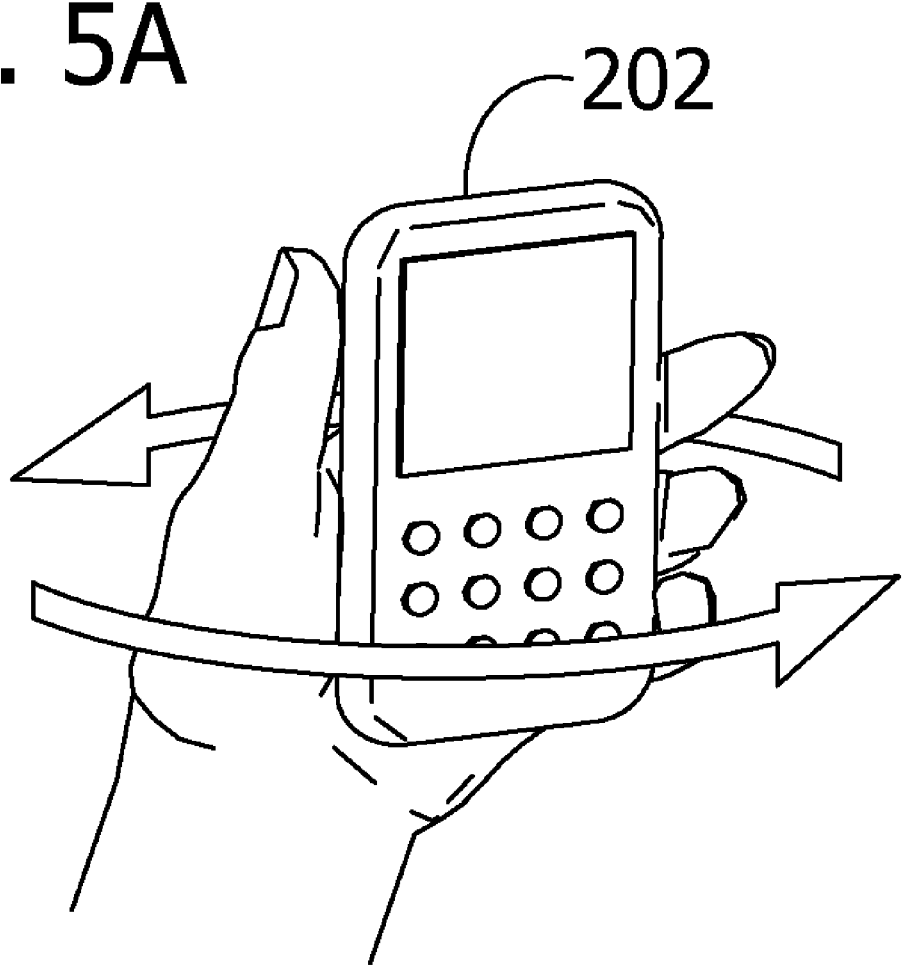
FIGS. 5A-5C illustrate rotation of a mobile computing device along various axes.
Figure 5B:
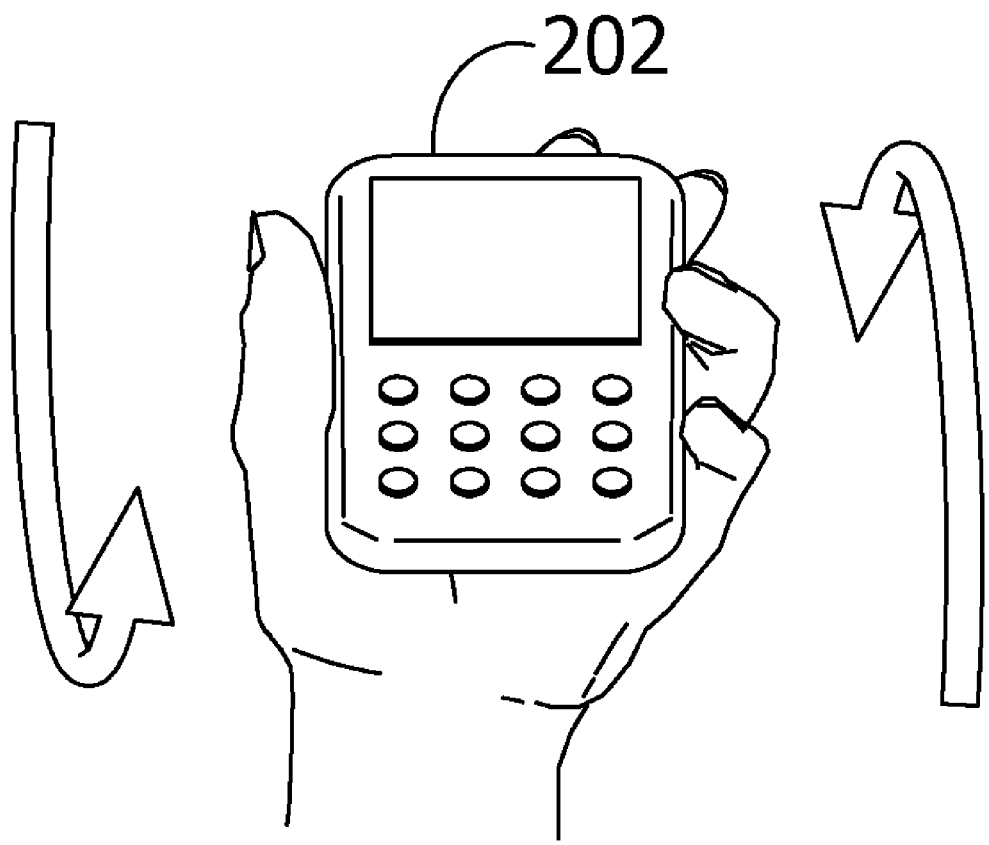
Figure 5C:
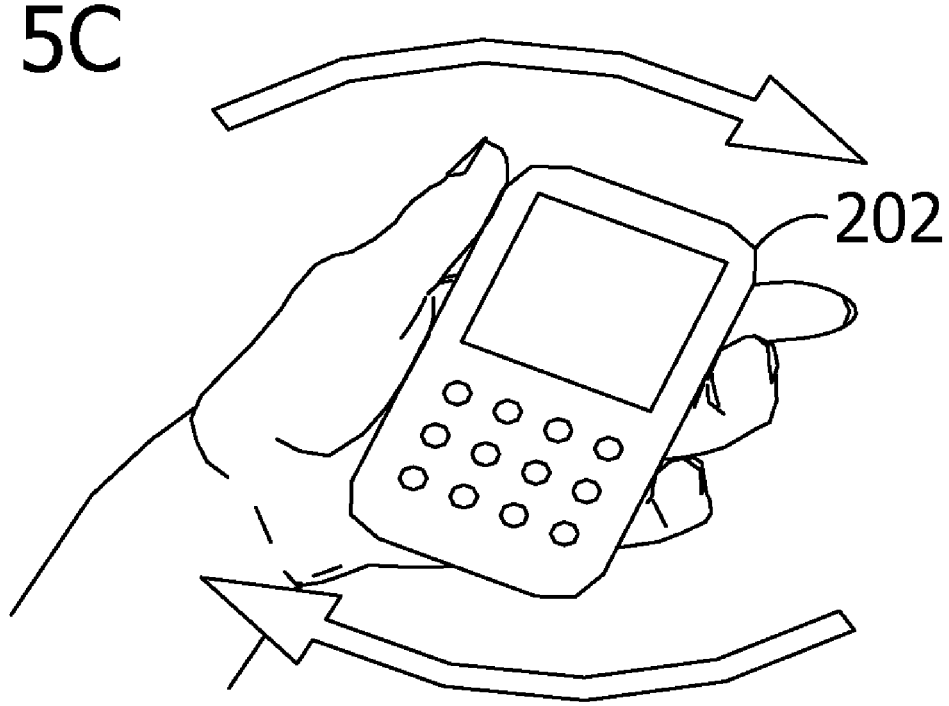

FIGS. 5A-5C illustrate rotation of the mobile computing device 202 along various axes. While the degrees of freedom illustrated in FIGS. 5A-5C define movement in a three-dimensional space, aspects of the invention are operable with any quantity and types of degrees of freedom. Further, the movement may relate to translational or rotational movement. FIG. 5A illustrates a side-to-side tilting of the mobile computing device 202, FIG. 5B illustrates a forward-backward tilting of the mobile computing device 202, and FIG. 5C illustrates a twisting motion of the mobile computing device 202.

Figure 6:
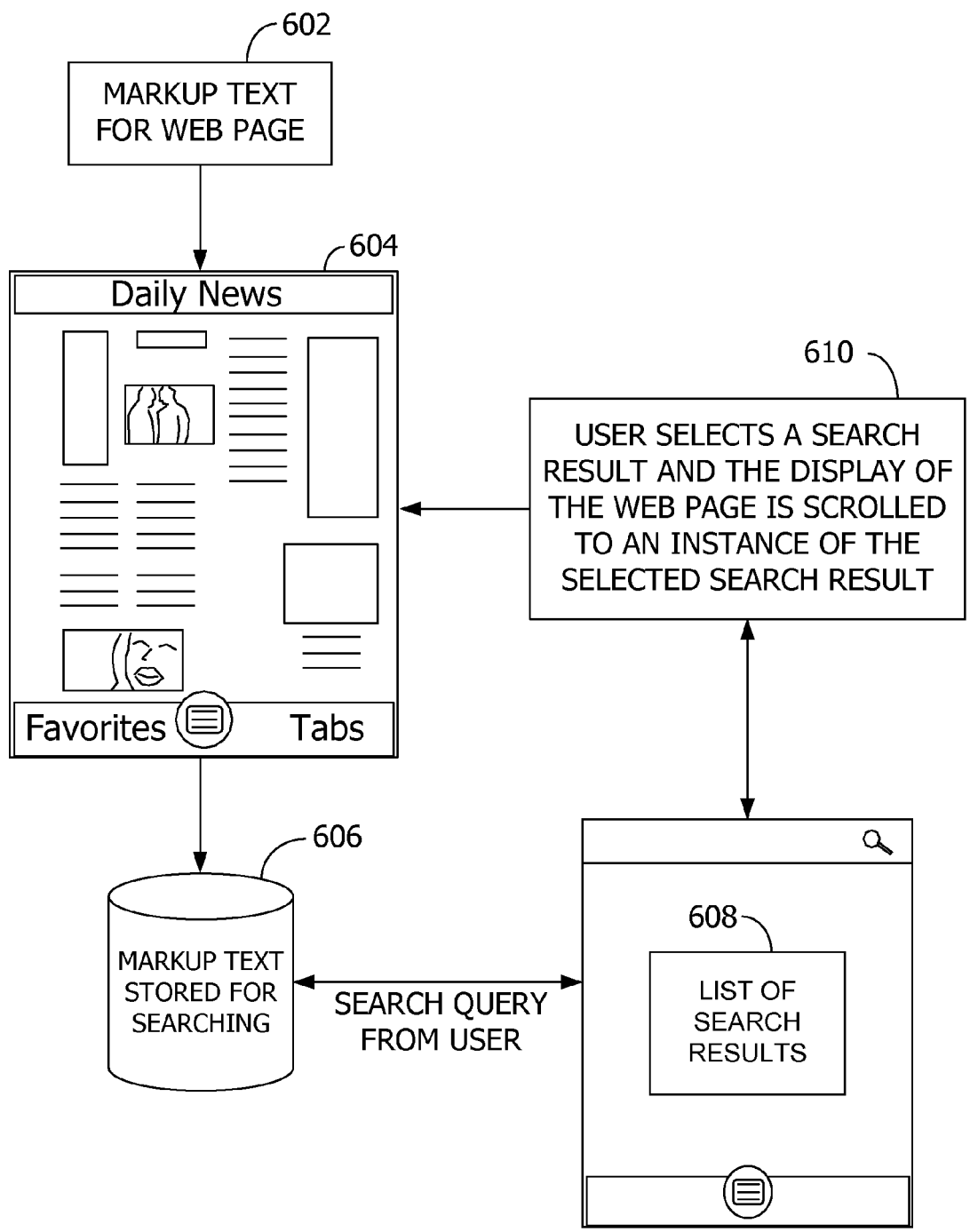
FIG. 6 is an exemplary block diagram illustrating searching of data in a web page.

Referring next to FIG. 6, an exemplary block diagram illustrates searching of data in a web page. FIG. 6 represents a particular embodiment of the invention involving the search of content within a web page. Markup text associated with the web page is received by the computing device 104 in block 602. The web page is displayed in block 604 using the received markup text. The markup text is stored for further processing in a memory area such as shown in block 606. Additional information that may be stored includes the location of each portion of the text in the web page, as well as text describing the web page (e.g., metadata such as file names, etc.). As the user 102 types characters corresponding to a search query into the computing device 104, a list of search results 608 is dynamically displayed in a window in the user interface. The list 608 automatically narrows as the user 102 enters each character. In an example, an image on the page <img src="glassslipper.jpg"> may be found by typing "gla".

At 610, the user 102 selects one of the search results and the display of the web page is scrolled to the first instance of the selected search result. In other embodiments, the web page scrolls to the first instance of the top-listed search result without the user 102 having to select one of the search results. The user 102 is able to review the other search results by scrolling to the next matching search result (e.g., selecting a "next" button on the user interface).

In an embodiment in which the block 606 is memory-constrained, markup text and other metadata for a previous web page is unloaded and deleted to make room for the markup text and metadata for the web page currently being displayed.

One example of FIG. 6 is next described. Using a mobile telephone, a web user browses to a friend's blog to search for text that may mention "Eva." Using the twelve-button keypad on the mobile telephone, the web user presses the "3" button. All words starting with the letters D, E, or F have their first letter highlighted, even some words that are not in view. The web user then presses the "8" button. The page scrolls down to the word "dumb". The web user then presses the "2" button. The first "Eva" hit scrolls into view. To find another mention of the name, the web user presses a soft key programmed to advance the display to the next result. By selecting functionality such as "Show All Matches," the web user views a list view of all hits for "Eva" with context such as " . . . then Eva said she liked it . . . " and " . . . car because Eva's family lives in . . . " When the web user selects a particular entry in the list view, the page view is shown and scrolled to the selected search result. In an embodiment, the browser is in one column view and all text is readable without horizontal scrolling.

In an embodiment, user 102 interactions with the search results are defined for each type of search result. For example, telephone numbers are linked to functionality for dialing the telephone numbers, addresses are linked to functionality for mapping the addresses, etc.

Figure 7:
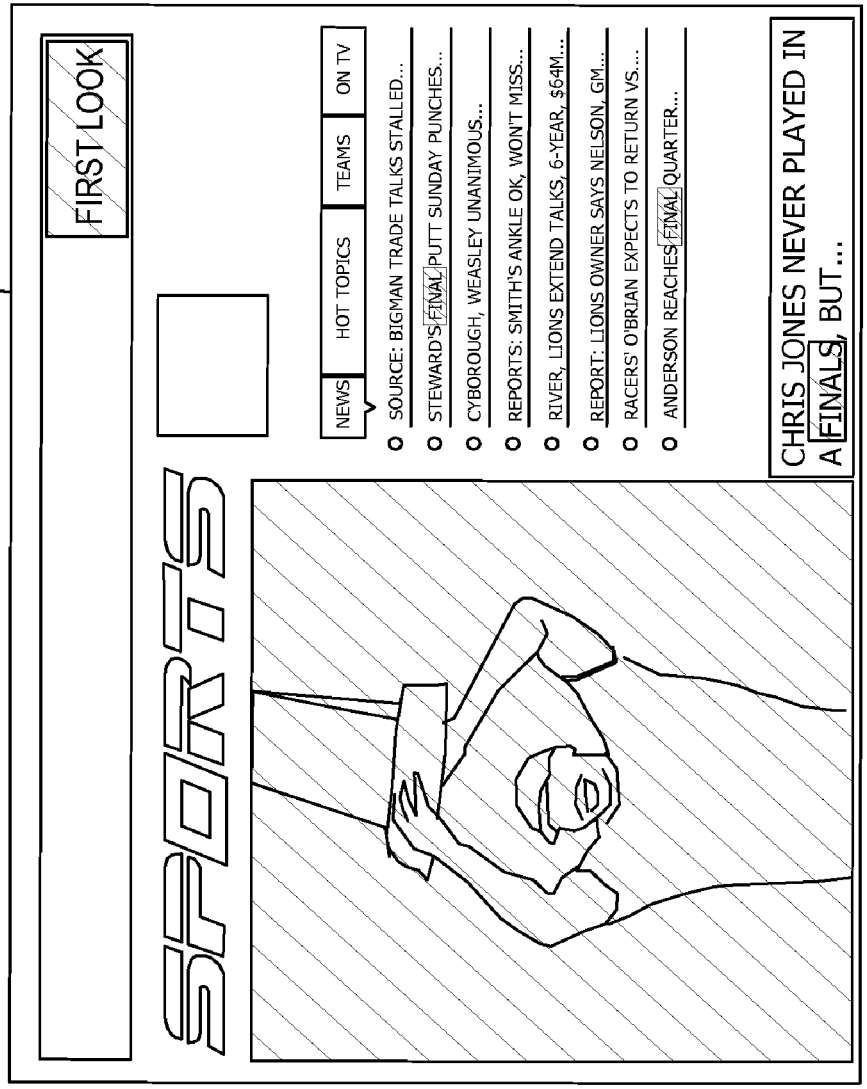
FIG. 7 is an exemplary user interface with portions of a web page highlighted.

Referring next to FIG. 7, an exemplary user interface 702 shows portions of a web page highlighted. The user 102 browses to a web page on the mobile computing device 202. The user 102 types in either "F-I" on a QWERTY keyboarded device or "2-3" on a standard 12-key device. The browser zooms out the web page to show all of the matches for "F-I" (or any other combinations that "DEF" and "GHI" would make on the page). The zoom range is defined by the number of matches and the location of the matches on the page. If the number of matches is great enough that the results cannot be displayed with readable text size, then the viewport is zoomed out to include all of the results plus the natural text wrapping locations for each of the blocks of text to provide the appropriate context for the results. The exact number and spacing of the matches is extensible based on the physical dimensions and resolution of the screen of the mobile computing device 202. The matches are highlighted on the page. In the example of FIG. 7, there are several words highlighted that match the "F-I" criteria along with one image highlighted because the image name contains the word "Final", thus matching the F-I search criteria.

Figure 8:
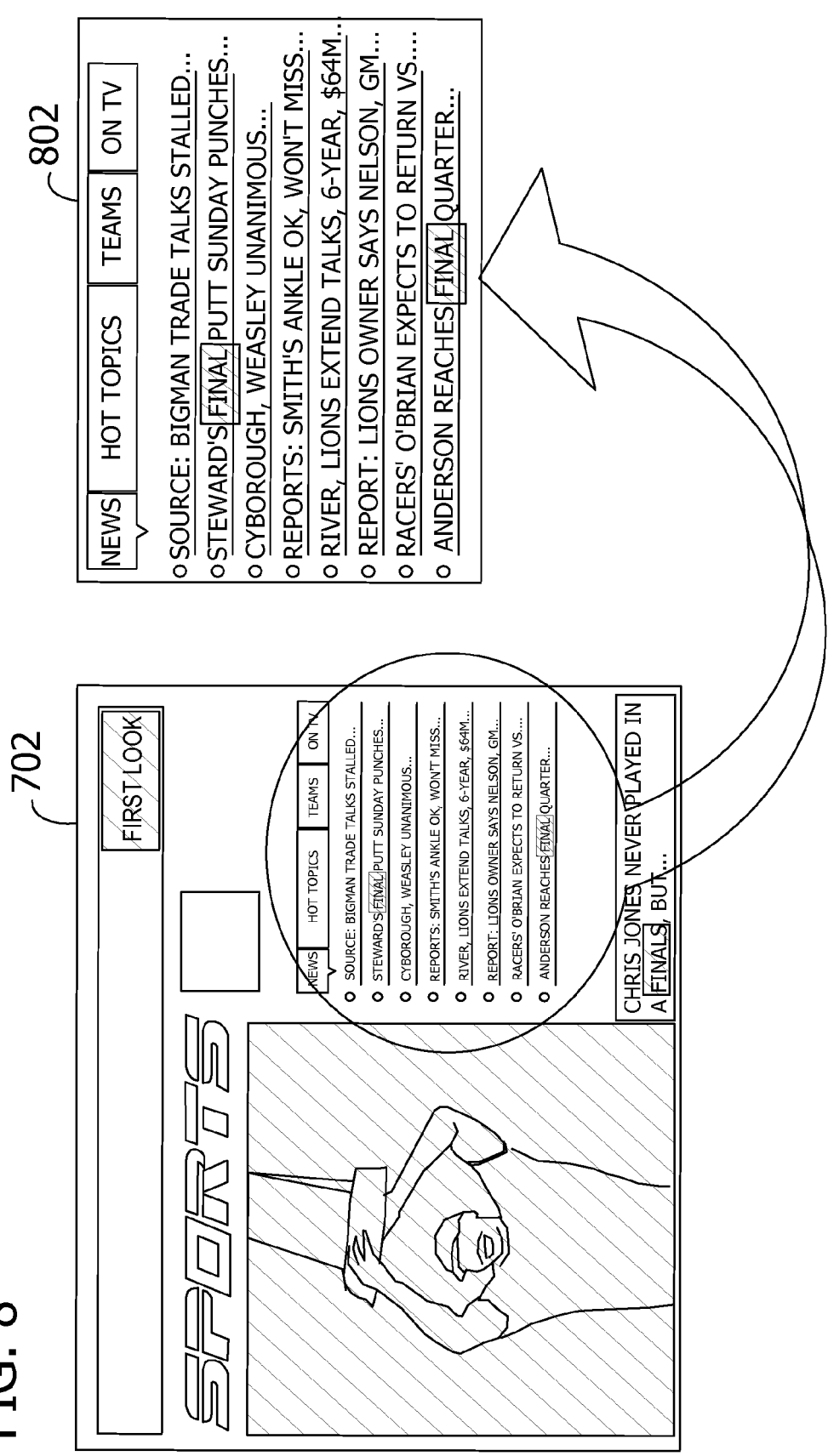
FIG. 8 is an exemplary user interface with a portion of a web page enlarged for readability.

Referring next to FIG. 8, a portion 802 of the user interface 702 of FIG. 7 is enlarged for readability. In the example of FIG. 8, the user 102 has chosen to interact with the search results (e.g., by going into a "results mode" or the like). In an embodiment, when the results are narrowed such that all the results can be displayed in a single view that has text of readable size, the user 102 automatically goes into results mode). In the example of FIG. 8, the user interface zooms to the top, right-most search result to show a readable version of the page and highlights the results. The markup of the web page is used to indicate logical display blocks of text to provide context.

In an embodiment in which the web page is being rendered on the mobile computing device 202, the user 102 advances through the results by entering commands into the mobile computing device 202 or by tilting or shaking the mobile computing device 202. For example, tilting the mobile computing device 202 to the right pans the web page in the user interface to the next result and zooms as necessary to keep the text a readable size. Tilting the mobile computing device 202 towards the left pans the web page in the user interface to the previous results. Shaking the mobile computing device 202 up and down clears the search.

Exemplary Operating Environment

A computer or computing device 104 such as described herein has one or more processors or processing units, system memory, and some form of computer readable media. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

The computer may operate in a networked environment using logical connections to one or more remote computers, such as a remote computer. Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein. Aspects of the invention may also be practiced in distributed computing environments where tasks are performed by remote processing devices that are linked through a communications network. In a distributed computing environment, program modules may be located in both local and remote computer storage media including memory storage devices.

The embodiments illustrated and described herein as well as embodiments not specifically described herein but within the scope of aspects of the invention constitute exemplary means for reviewing the search results responsive to movement of the computing device 104.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. One or more tangible computer storage media storing computer-executable components for reviewing search results from a web page on a mobile computing device, said components comprising:

a display component for providing textual data associated with a web page rendered in a user interface on the mobile computing device;

an interface component for receiving a sequence of keystrokes from a user;

a search component for dynamically identifying portions of the textual data provided by the display component, said portions representing results of a search of the textual data based on the sequence of keystrokes received from the user by the interface component, the search component dynamically updating and magnifying the identified portions as each keystroke in the sequence is received by the interface component;

a zoom component for adjusting a size of the web page displayed in the user interface as a function of quantity and location of the portions identified by the search component in the web page such that all the portions are visible to the user within the user interface without scrolling, wherein, responsive to the search component updating and magnifying the identified portions, the zoom component adjusts the size of the web page without user input, and wherein the display component displays the adjusted web page to the user in the user interface;

a sensor component for receiving input from the user, said input corresponding to movement of the mobile computing device by the user; and a scroll component for advancing through the identified portions as a function of the input received by the sensor component.

2. The tangible computer storage media of claim 1, wherein the sensor component receives input from an accelerometer.

3. The tangible computer storage media of claim 1, wherein the keystrokes correspond to a search query.

4. The tangible computer storage media of claim 1, wherein the movement comprises the user tilting and/or shaking the mobile computing device.

5. A method comprising:

displaying a document in a user interface on a computing device, said document having textual data associated therewith;

receiving a search query comprising a sequence of characters inputted by a user into the computing device;

applying the received search query to the textual data to generate search results;

adjusting, without input from the user, a size of the document displayed in the user interface as a function of quantity and location of the search results in the document such that all the search results are visible to the user within the user interface without scrolling, the size of the document being dynamically adjusted as each character in the sequence is inputted by the user;

receiving input from the user, said input corresponding to movement of the computing device by the user; and panning through the generated search results to a next search result as a function of the received input and magnifying the next search result.

6. The method of claim 5, wherein the textual data comprises one or more of the following: a description of content associated with the document, a file name of content associated with the document, and markup text associated with the document.

7. The method of claim 5, wherein receiving the input from the user comprises receiving a signal identifying the movement of the computing device.

8. The method of claim 5, wherein receiving the input from the user comprises receiving the input from one or more of the following: a piezo-electric accelerometer, a piezo-resistive accelerometer, a strain gage accelerometer, and a microelectromechanical accelerometer.

9. The method of claim 5, wherein the search results are organized sequentially in a memory associated with the computing device, and wherein the input represents a plurality of tilting movements of the computing device in a first direction and in a second direction, and wherein panning through the generated search results comprises advancing to the next search result responsive to each of the tilting movements in the first direction and advancing to a previous search result responsive to each of the tilting movements in the second direction.

10. The method of claim 5, wherein the input indicates a shaking movement of the computing device, and further comprising clearing the search results responsive to the shaking movement.

11. The method of claim 5, further comprising highlighting each of the search results during said panning.

12. The method of claim 5, wherein receiving the search query comprises receiving each of the characters in the sequence of characters, wherein applying the received search query comprises applying each of the characters upon receipt to the textual data to update the search results, and wherein adjusting the size of the document comprises dynamically adjusting the size of the document as each character in the sequence of the characters is inputted by the user such that the updated search results are visible to the user within the user interface without scrolling.

13. The method of claim 5, wherein panning through the search results comprises scrolling the document horizontally as a function of the received input.

14. A system comprising:
   a memory area for storing content associated with a document rendered in a user interface on a computing device; and
   a processor for executing computer executable instructions for:
      receiving a first keystroke from a user;
      identifying portions of the content stored in the memory area by searching the content based on the received first keystroke, said identified portions including search results from the search of the content, said identified portions containing a first plurality of words beginning with the received first keystroke;
      dynamically determining a first size of the document for display in the user interface as a function of the first plurality of words contained in the identified portions such that all the identified portions are visible to the user within the user interface without scrolling or other user input;
      responsive to the determination of the first size of the document for display, displaying the document in the user interface at the determined first size;
      receiving a second keystroke from the user;
      identifying a subset of the identified portions by searching the identified portions based on the received first and the received second keystroke, said identified subset comprising search results from the search of the identified portions, the identified subset containing a second plurality of words beginning with the received first and the received second keystroke in sequence;
      dynamically determining a second size of the document for display in the user interface as a function of the second plurality of words contained in the identified subset of the identified portions such that all the portions in the identified subset are visible to the user within the user interface without scrolling or other user input; and
      responsive to the determination of the second size of the document for display, displaying the document in the user interface at the determined second size.

15. The system of claim 14, wherein the content comprises markup text associated with an image.

16. The system of claim 14, wherein the computing device comprises a mobile telephone, and wherein the processor receives the first keystroke and the second keystroke from the user via a twelve button keypad on the mobile telephone.

17. The system of claim 14, further comprising means for reviewing the results of the search of the content based on the received first keystroke responsive to movement of the computing device.

18. The system of claim 14, wherein the processor executes computer-executable instructions for determining the first size by determining a zoom range based on a quantity and location of the identified portions.

19. The system of claim 14, wherein displaying the document in the user interface comprises displaying the document in the user interface at the determined first size with the identified portions highlighted.

20. The system of claim 14, wherein displaying the document in the user interface comprises displaying the document in the user interface at the determined first size with the identified portions having a larger font size than the other portions.

* * * * *